June 27, 1933. W. DARBYSON Re. 18,882

AIRPLANE

Original Filed April 7, 1930

INVENTOR.
WALTER DARBYSON.
BY Smart & Biggar.
ATTORNEYS.

Reissued June 27, 1933 Re. 18,882

UNITED STATES PATENT OFFICE

WALTER DARBYSON, OF MONTREAL, QUEBEC, CANADA

AIRPLANE

Original No. 1,800,439, dated April 14, 1931, Serial No. 442,062, filed April 7, 1930. Application for reissue filed June 23, 1932. Serial No. 618,903.

This invention relates to airplanes and more particularly to devices for causing the vertical rise of an airplane of the heavier-than-air or rigid type.

An object of this invention is a device applicable to airplanes of the class above described which, upon operative movement causes a true vertical rise of the airplane.

A further object is a device which, when operated will cause an airplane to remain motionless, without descending.

A still further object is an attachment for airplanes which is simple in its construction and which has means forming a part thereof to provide an auxiliary drive for the airplane.

Figure 1:
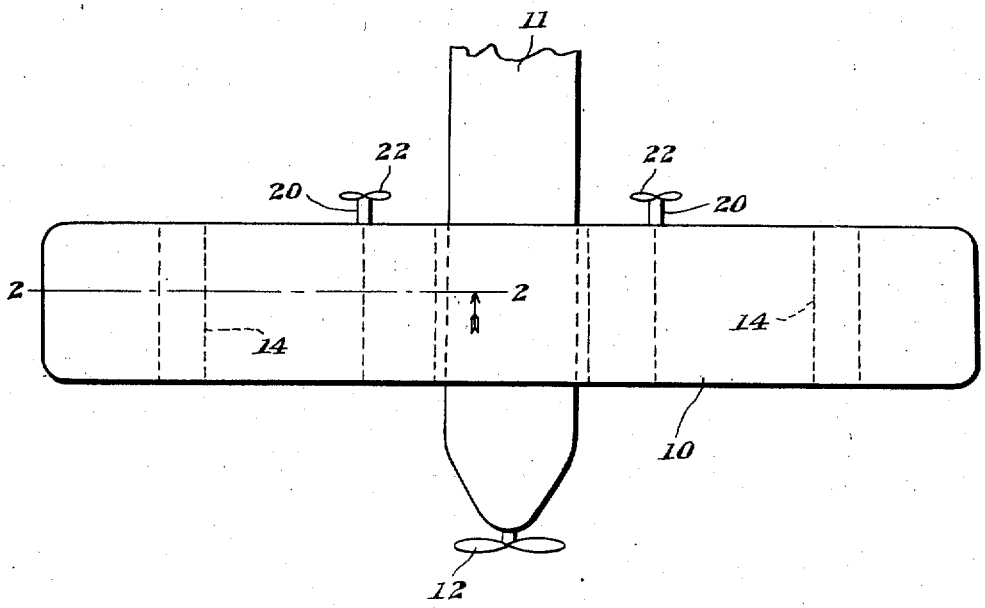

Still other objects will readily occur to those skilled in the art upon reference to the following description and the accompanying drawing in which Figure 1 is a plan view of an airplane equipped with the device of the present invention.

Figure 2:
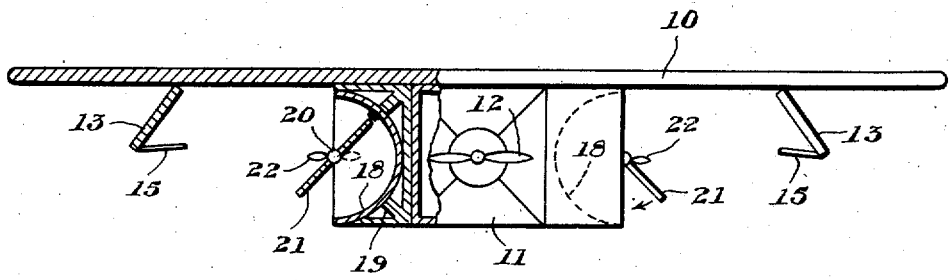

Figure 2 is a front elevation view thereof, partly in section along the line 2—2 of Figure 1.

Referring to the drawing, there is shown an airplane of the monoplane type having a wing 10, fuselage 11, and the usual propeller 12. The construction thus far is conventional and forms no part of the present invention.

Attached to the underside of the wing 10 are vanes or fins 13 pivotally movable about the line indicated at 14 and adapted to be controlled by means such as the control rods 15. Adjacent each vane 13 is a casing 18 supported in any suitable manner, such as by supports 19, and having therein a shaft 20 upon which is mounted a fan blade 21 and at the rear end of which is mounted a propeller 22.

As indicated, vanes 13, casings 18, shafts 20, and fan blades 21 extend transversely along the wing and may be of a length equal to the width of the wing.

The operation of the device will be obvious from the foregoing. Rotation of each fan in the direction indicated by the arrows will cause the flow of a stream of air through each semi-circular casing 18, against the underside of the wing 10 and against the suitably deflected vane 13, whereupon the air pressure will cause elevation or rising of the airplane.

Furthermore, when the airplane is in motion and it is desired to hover about a suitable landing point, each fan 21 is rotated to counteract the force of gravity tending to lower the plane.

It will be understood that each vane or fin 13 is movable to lie against the underside of, or within the wing 10 during flight of the plane so that no unnecessary air resistance is offered.

Furthermore, it will be noted that the propellers 22 will function as an auxiliary driving means when shafts 20 are rotated, this construction being employed, as a rule, only when the main power plant is not functioning properly or when additional force is desired, or when a slow or hovering speed is required.

It will be understood that the shafts 20 may be rotated by separate engines or by the main engine, usually located in the fuselage, connection between the main engine and the shaft being had by suitably provided gearing or the like.

It will also be noted that the vanes 13 may be controlled from the inside or outside of the wing, as desired. Furthermore, the device may be applied to any suitable type of plane including monoplanes, bi-planes, etc. Furthermore, shafts 20 may be provided with any desired number of fan blades, the number depending upon the load to be carried by the plane.

It will be observed that the casing 18 extends part way around the fan blades mounted on the shaft 20 and is thereby adapted to screen part of the blades during motion and to deflect the air moved by the blades along the wing. The downward reaction which would otherwise be produced by the upwardly moving wings is thus avoided, and the casing, being positioned adjacent to the wing, cooperates with the wing in giving direction to the air propelled by the blades.

Now having described the invention and the preferred embodiment thereof, it is to be understood that the said invention is to be limited, not to the specific details herein set forth, but only by the scope of the claims which follow.

What I claim as my invention is:

1. In an airplane having a wing, a fuselage centrally located beneath the wing and extending transversely thereof for a considerable distance, fan casings on the sides of said fuselage under the wing, fans in said casings mounted on shafts projecting to the rear of the wing, the shafts having propellers thereon, and vanes pivotally connected and secured to the undersurface of the wing, the fans discharging against the inclined undersurfaces of the vanes.

2. In an airplane and in combination a fuselage, a transverse wing extending on opposite sides of the fuselage, a pair of transverse shafts mounted on opposite sides of the fuselage directly below the wing, fan blades on the side shafts and semi-cylindrical casings extending around said fan blades whereby any downward reaction of the upwardly moving blades is avoided, the upper extremity of said casings terminating adjacent to the under surface of said wing whereby the air moved by the blades is deflected along the under surface of the wing.

In testimony whereof I have set my hand at the city of Montreal, in the Province of Quebec, Dominion of Canada, this 11th day of June, 1932.

WALTER DARBYSON.